United States Patent [19]

Le Van Suu

[11] Patent Number: 5,515,504
[45] Date of Patent: May 7, 1996

[54] METHOD FOR CHECKING CONFORMITY TO A STANDARD OF A REPRESENTATIVE MODULE OF A CIRCUIT DEDICATED TO MANAGEMENT OF A COMMUNICATIONS PROTOCOL, AND SYSTEM FOR IMPLEMENTING IT

[75] Inventor: Maurice Le Van Suu, Romainville, France

[73] Assignee: SGS-Thomson Microelectronics S.A., Saint-Genis Pouilly, France

[21] Appl. No.: 997,642

[22] Filed: Dec. 28, 1992

[30] Foreign Application Priority Data

Dec. 27, 1991 [FR] France .................... 91 16235

[51] Int. Cl.[6] .................................................. G06F 11/00
[52] U.S. Cl. ........................................................ 395/183.04
[58] Field of Search .............................. 371/16.2, 23, 22, 371/22.1; 364/264.3, 285, 285.4, 578, 364, 489, 488, 490; 395/575, 500, 183.04, 183.05

[56] References Cited

U.S. PATENT DOCUMENTS

| | | | |
|---|---|---|---|
| 4,694,422 | 9/1987 | Kakuda et al. .................... | 364/900 |
| 5,097,469 | 3/1992 | Douglas ............................. | 371/20.1 |
| 5,163,016 | 11/1992 | Har'El et al. ..................... | 364/578 |
| 5,301,280 | 4/1994 | Schwartz et al. ................ | 395/325 |

OTHER PUBLICATIONS

"On the Horizon: fast chips quickly", IEEE, Mar. 1984, By P. Wallich, pp. 28–34.
"PSi: A Silicon Compiler For Very Fast Protocol Processing", *IFIP Workshop on Protocols for High–Speed Networks*, 1989, By H. Abu–Amara et al., pp. 181–195.
"Silicon compiler lets system makers design their own VLSI chips", *Electronic Design*, Oct. 1984, By S. Johnson, pp. 167–181.
"Semiautomatic Implementation of Communication Protocols", *IEEE Transactions on Software Engineering*, vol. SE–13, No. 9, Sep. 1987, By G. Bochmann et al., pp. 989–999.

*Primary Examiner*—Robert W. Beausoliel, Jr.
*Assistant Examiner*—Norman M. Wright
*Attorney, Agent, or Firm*—David M. Driscoll; James H. Morris

[57] ABSTRACT

Method and apparatus for checking conformity to a predetermined standard of a representative defined module of a circuit dedicated to management of a communications protocol, which module has been optimized in advance for a given application. The disclosure features duplicating the module with a view to generating several duplicated modules which are identical to the module and operatively connecting the duplicated modules to a network bus. Each duplicated module is configured differently according to definitions contained in the standard, so that the set of configured modules is representative of real operating conditions of the designed circuit. Bus signals are applied to the network, which signals are representative of frames in accordance with the standard and abnormal or parasitic signals, and the respective responses from each of the configured modules are collected back for analysis.

20 Claims, 3 Drawing Sheets

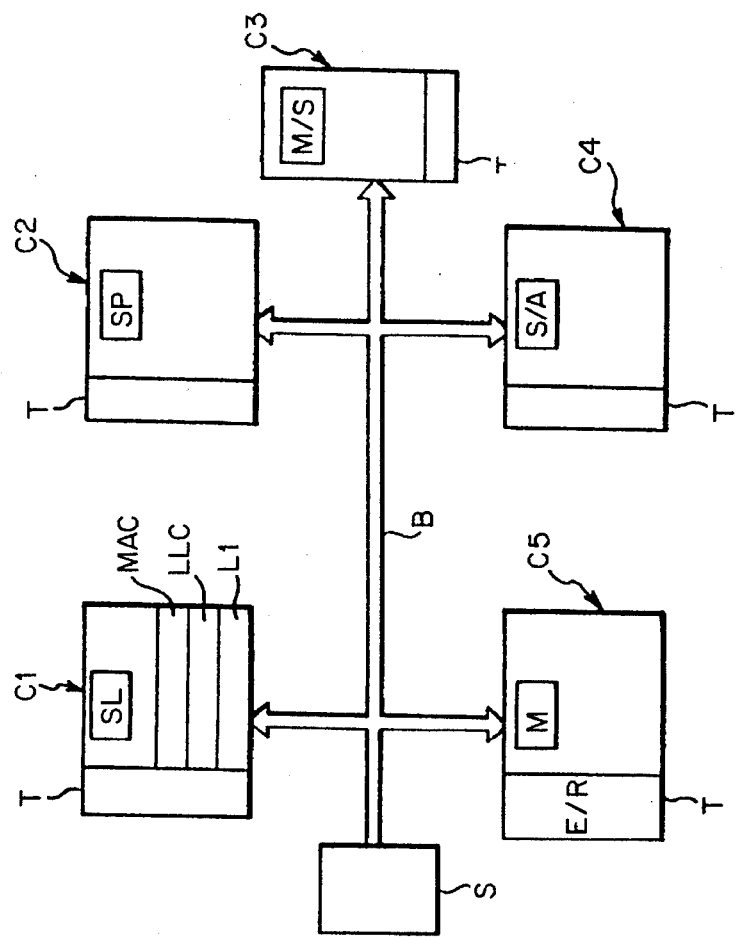
FIG_3
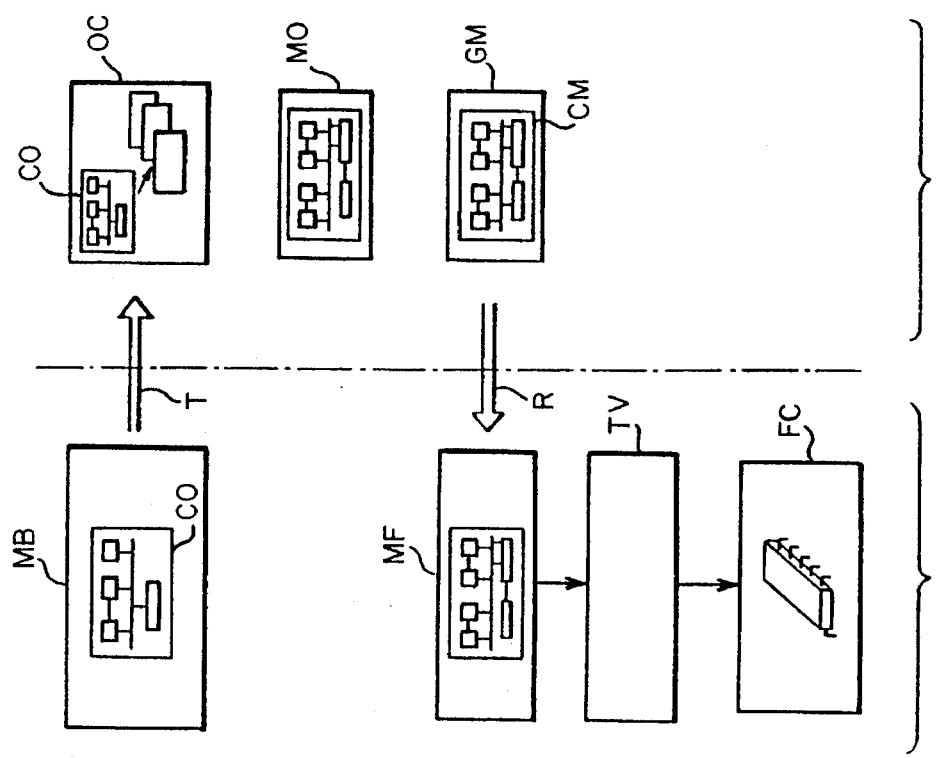
FIG_1
(PRIOR ART)

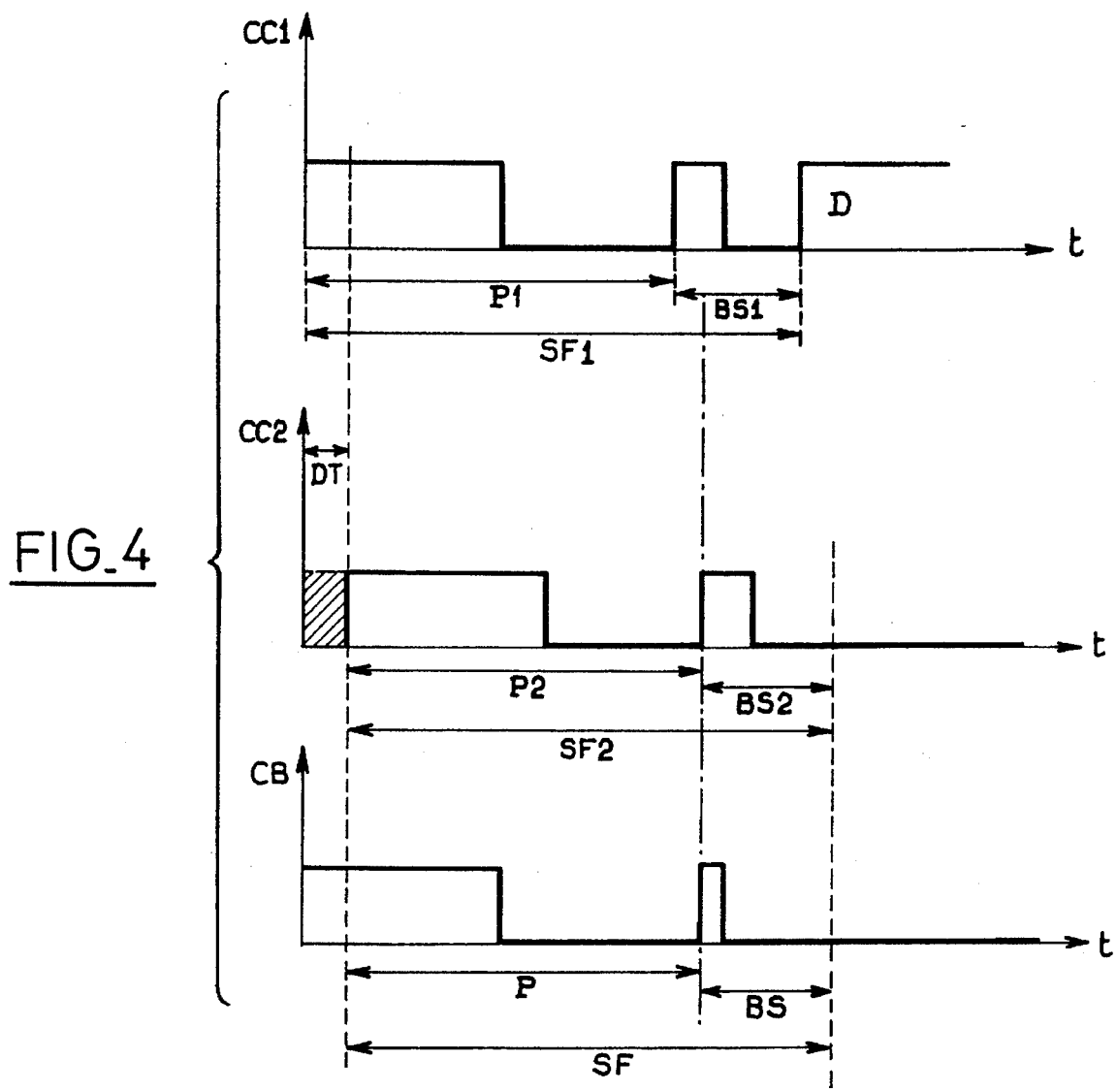
FIG_4
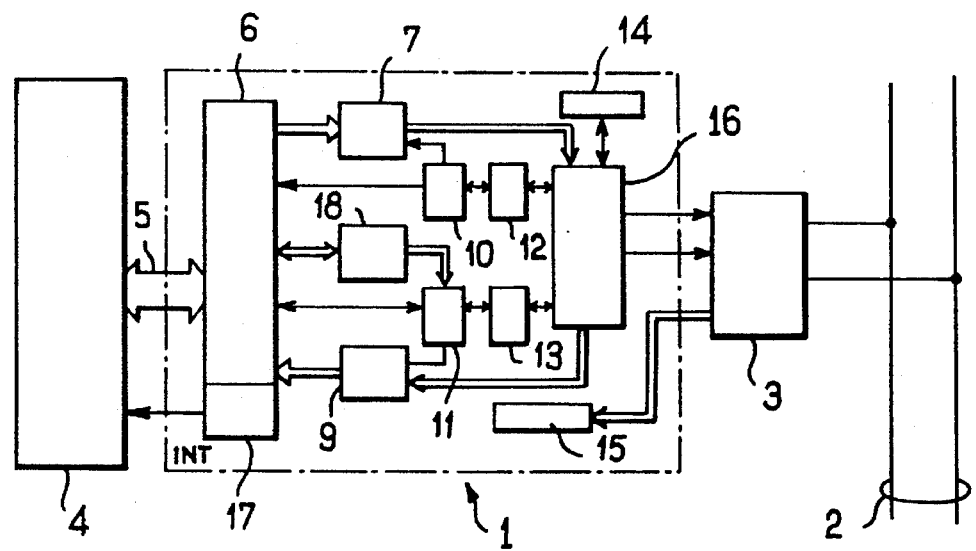
FIG_5

METHOD FOR CHECKING CONFORMITY TO A STANDARD OF A REPRESENTATIVE MODULE OF A CIRCUIT DEDICATED TO MANAGEMENT OF A COMMUNICATIONS PROTOCOL, AND SYSTEM FOR IMPLEMENTING IT

FIELD OF THE INVENTION

The present invention relates to a method for checking conformity to a standard of a representative module of a circuit dedicated to management of a communications protocol.

It also relates to a system employing this method.

PRIOR ART

The considerable development in communications technology has been accompanied appropriately by the development of standards which have to be adhered to by any communications and equipment component manufacturer.

Until now, it has been usual to check whether finished equipment conforms to a predetermined standard after its manufacture, by using a model equipment item for reference simulation of a communications network.

This practice constrains each equipment maker to devote significant development effort solely to guaranteeing adherence to the standard associated with the communications protocol employed, although conformity to the standard, needless to say, represents only one aspect, albeit an indispensable aspect, of numerous functions required of items of communications equipment.

One proposed solution consists of using this method only on one or more specialized components dedicated to communications protocol management. However, while the cost price of electronic equipment continually tends to fall, it can no longer be envisaged in many cases to provide for specialized communications circuits.

Other solutions to the problem of checking conformity of components to a standard have also been proposed to equipment makers, such as those consisting of "remodeling" the component under test in order to optimize its design in terms of cost and performance, or even to rework the software from the outset when designing the component in question.

Moreover, at the moment of the qualification of a finished product for one or more given applications, the equipment makers do not always have the certainty of being in exact conformity with the prescribed standard, especially when they do not have sufficient time available to test these products in correct conditions.

SUMMARY OF THE INVENTION

The object of the invention is to remedy this drawback by proposing a method for checking conformity to a predetermined standard of a representative module of a circuit dedicated to management of a communications protocol, said module having been optimized in advance for a given application.

According to the invention, the method comprises a first step for duplicating said module with a view to generating several duplicated modules which are identical to said module;

a second step for connecting said duplicated modules to a network bus;

a third step for configuring each duplicated module according to definitions contained in said standard, so that the set of said configured modules is representative of real operating conditions of the designed circuit; and a fourth step for applying to the network bus signals which are representative of frames in accordance with said standard and abnormal or parasitic signals, and for collecting back, for analysis, the respective responses from each of said configured modules.

Thus, with the method according to the invention, checking of conformity is carried out upstream from the manufacture of products and components, at the stage of their design and their manufacture. The method according to the invention makes it possible to determine and predict the behavior of a component well before its integration and its insertion within an electronic card. It also makes it possible to reduce the design time and to optimize a component without the risk of departing from the prescribed standard.

Moreover, with the method according to the invention a time and cost advantage is obtained in testing the finished product. Indeed, if a possible problem is detected by employing the method according to the invention, corrective action is carried out at the source of the design, which avoids having to rework the finished product. The impact of these corrective actions on the development investment for a new product then remains very low, if not sometimes insignificant.

In one advantageous embodiment of the invention, the tested module has been obtained by modification of an initial module described at a very high description level.

Thus, conformity checking may relate both to modules designed on conventional combinational and sequential logic description bases and also modules designed by using a high-level descriptive approach, especially the VHDL type.

According to another aspect of the invention, the system for checking the conformity to a predetermined standard of a representative module of a circuit dedicated to management of a communications protocol, said module having been optimized in advance for a given application, employing the method according to the invention, comprising means for processing representative modules of circuits, is defined in that these processing means are arranged to duplicate said module and to generate several duplicated cells identical to said module, and comprises means for connecting said duplicated modules to a network bus, means for configuring each duplicated module according to definitions contained in said standard in such a way that the set of said configured modules is substantially representative of real operating conditions of the circuit to be checked, and means for generating signals on the network bus.

BRIEF DESCRIPTION OF THE DRAWINGS

Furthermore, other features and advantages of the invention will appear in the description below, in the attached drawings which are given by way of nonlimiting examples:

FIG. 1 is a diagram illustrating the main phases of a process of producing dedicated circuits such as those employed in the prior art;

FIG. 3 more particularly illustrates an example of implementation of the method according to the invention;

FIG. 4 brings together the timing diagrams for frame signals coming respectively from two modules and from a; and FIG. 5 shows the simplified internal structure of a protocol management circuit for which the method according to the invention can be employed.

DESCRIPTION OF THE PREFERRED EMBODIMENTS

Figure 2:
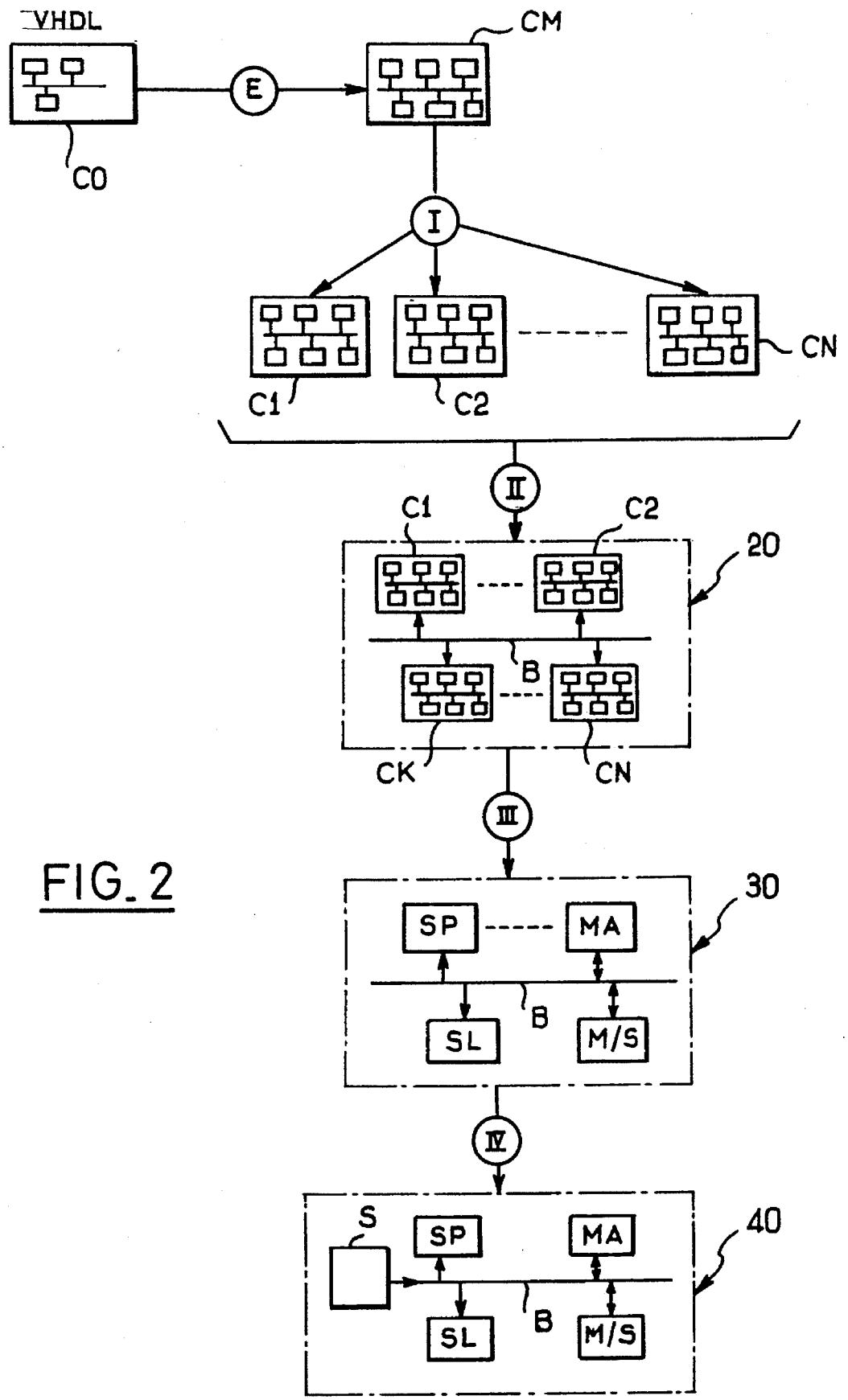
FIG. 2 is a block diagram illustrating the main steps of the method according to the invention.

A few essential elements of the prior art will first of all be recalled so that the invention can be better understood.

The conventional design steps are:

use of a circuit development tool;

laying out and routing of the circuit;

generation of masks;

fabrication of the circuit and/or of prototypes; and production.

The essential functions of a development tool may be briefly broken down into:

1/a description of the component to be developed at a very high level (VHDL);

2/a compilation taking account of the technology;

3/a symbolic generation of the circuit employing a library of modules; and

4/supply of a symbolic diagram representing the circuit and its function.

The method according to the invention may be implemented during any one of these steps, and in any event before the manufacturing step.

The French patent application No. 9111630 of Sep. 20, 1991 in the name of the present applicant discloses a method for designing protocol handler integrated circuits, which employs a VHDL type description and includes the abovementioned steps. This method is particularly suitable for monitoring communications protocols according to the VAN standard.

It is recalled that:

VHDL means "Very High Description Level".

VAN means "Vehicle Area Network".

During design of a circuit which is dedicated to communications functions, it is a matter of combining a protocol function and one or more application functions in order to arrive at the finished product. Needless to say, interactions exist between communications protocol and applications, and the equipment maker generally aims to obtain the greatest correlation between the protocol function and the application functions.

In general, a component including a communications protocol function covers the following layers of the ISO international standard, known to the person skilled in the art:

a physical half-layer of the first layer of the ISO standard, namely not including the bus amplifier;

an LLC layer (Logical Link Control") and a MAC layer, ("Medium Access Control") and other layers aimed especially at routing and the application.

The various steps of the production process of circuits in which the method according to the invention is employed will now be described, with reference to FIG. 1.

A basic VHDL model generally comprises a core containing the protocol, a first and a second optional layer, as is disclosed in the abovementioned French patent application.

The initial model developed by the circuit manufacturer, and which has been described, for example, at the VHDL level (indicated by MB on FIG. 1) is transferred (step T) in its entirety to the client equipment maker on an appropriate medium, for example magnetic tape.

This client has a design tool OC available on his site, by means of which he modifies (step MO) the model supplied on the basis of his requirements and specific applications. He thus generates a new VHDL model (step GM). The set of operations carried out by the client equipment maker will be denoted by phase E in the following text.

This resultant model is transferred (step R) to the integrated circuit manufacturer. The resultant model is then shaped (step MF), tested and checked (step TV) according to a predetermined standard, for example, the VAN standard. At the termination of these various steps, the circuit is finally manufactured (step FC) according to known methods. In the following text reference F will indicate the set of operations carried out by the integrated-circuit manufacturer.

For a better understanding of the possibilities offered by the method according to the invention, it is necessary to outline the nature of the simulations carried out up to the present in the prior art. These simulations conclude "injecting" appropriate signals, called input stimuli, at the inputs of a digital model of the circuit being designed, in order to excite this circuit and analyze its behavior. The results of these simulations are obtained on various media, especially paper, or magnetic tape and/or may be stored in the computer-based design tool.

Checking stimuli may, by way of example, include checking the transmission speeds;

the correct operation of the circuit according to the type of coding;

the correct design of the coding and decoding parts;

the synchronization and/or resynchronization systems;

the address and masking recognition mechanism;

the mechanism for recognizing symbols in the frame;

the error correction code calculator;

the frame acknowledgement part;

the part for interface with the microprocessor or microcontroller;

the part managing loss of arbitration and collision on the bus;

the part for memory access to the circuit for reading or writing.

the zero-reset part of the circuit, via hardware or software action; and the client application part (reaction of the circuit on the basis of the message received).

In the prior art, each of the functional blocks mentioned above is engineered and tested in an uncorrelated way and reacts to the stimuli which are intended for it independently of the other blocks; it follows that possible interaction between several functional blocks can really be tested in terms of conformity to a standard only after the circuit has effectively been produced.

The method according to the invention will now be described in detail with reference to FIG. 2.

This method may be implemented at the stage of the abovementioned test and checking step TV, with reference to FIG. 1. At this stage, a circuit CM has been designed and modified (phase E) by the client equipment maker on the basis of his specific requirements from an original model CO described, for example, at a VHDL level and supplied by the manufacturer; it should be noted that this circuit CM may very possibly have undergone some of the abovementioned checks in advance. It is available for test in the form of a software module, an image of a hardware structure, which will be called modified module in the rest of this description.

The first step I of the method according to the invention includes generating, from the modified module CM, several identical modules C1, C2, ... CN by duplication.

The second step II envisages connecting these different modules C1, C2, ... CN to a digital bus B which may possibly be multiplexed, and representative of the final environment of the application for which the tested circuit is intended. This connection establishes a software test structure 20.

During the third step III of the method according to the invention, each module produced by the duplication is configured according to the definition of the communication standard chosen, for example, the abovementioned VAN standard.

By way of example, in the case of this standard, a module may be configured in a mode called Spy (SP), while other modules may be configured in other modes such as:

Master/Slave (M/S);

Slave (SL);

Master (MA);

Slave with acknowledgement; and

Slave without acknowledgement.

The set of these modes corresponds to the various definitions contained in the standard, each configuration mode corresponding to one of the expected operating states of the final circuit.

At the end of this configuration step, a network configured structure 30 is available, being as close as possible to the representative environment of the final application.

The fourth step IV includes connecting a scrambler system S to the bus B which has the function of generating parasites and stimuli which are as representative as possible of the situations which may be encountered on the communications network. It is then possible to analyze, in each module and on the bus, all the signals emitted and received and thus to check their conformity to the appropriate standard according to current analysis techniques.

Thus, the scrambler S has to be adapted to inject frames onto the bus B such as:

a standard frame according to the standard followed;

a frame with a speed variation related to the information input on the bus; and a standard frame and/or a frame with a variation in speed and/or random or predetermined parasites on the bus during sending or receiving.

FIG. 3 illustrates an example of a test structure in accordance with the VAN standard obtained with the method according to the invention, at the end of the step IV mentioned above. Five modules C1–C5 have been obtained by duplication then each configured in a different way. Hence, a first module C1 is configured in Slave mode SL and incorporates layers L1, LLC and MAC. A second layer C2 is configured in Spy mode SP, a third layer in Master/Slave M/S mode, a fourth layer C4 in Slave mode S/A with response in the frame and a fifth layer C5 in Master M mode with a frame structure or pattern T which is adapted for sending/receiving. The other four modules are also endowed with a frame pattern T.

While configuring duplicated modules, various transmission speeds and addresses may be assigned to each of these modules. It is equally possible to check the bit coding and decoding blocks, the encapsulation of a frame, its decapsulation, the transmission speed of the calculator of the CRC, access by the interfaces between microprocessor and/or microcontroller, and memory access by the circuit, zero-resetting of the circuit (hardware and software), during, before and/or after sending or receiving a frame in a network environment which is the most representative of effective communication conditions (normal signals, abnormal signals, affected by parasites or otherwise).

Moreover, the method according to the invention also makes it possible to simultaneously observe the behavior of the design circuit in various different situations, which is very difficult to carry out in the context of a test before manufacture in the prior art. It is thus possible to study the dialog, for example, between module C1 and module C4 at the same time as reception by module C1 of control information from the other modules by the simple interplay of the configuration of the frames and internal addresses of said modules.

Moreover, the method according to the invention makes it possible to bring to light the operation of arbitration or collision blocks and verification of the notion of priority as a function of the configuration of each module (priority sending module addresses, token method, etc.). Indeed, it is sufficient to send a frame from the scrambler S or to define, during configuration step III, the possibility for two modules to simultaneously send on the network with a time offset from the line acquisition decision. It is equally possible to bring about this situation by injecting parasitic bit desynchronization or collision signals.

By way of example, a distortion of the preamble to a frame may be detected on the network bus with the method according to the invention, as FIG. 4 illustrates.

Consider two modules C1 and C2 each sending two frame signals on the bus B, the signals offset by a duration Dt and each comprising a preamble P1, P2 and a start bit BS1, BS2, the preamble and start bit constituting a frame start signal SF1, SF2 whose timing diagrams CC1 and CC2 are represented in FIG. 4. The resultant signal (timing diagram CB) on the bus B, obtained by implementing the method according to the invention, has a preamble P, a start bit BS and a frame start signal SF which are erroneous. Such a nonconformity could not be detected with the tests applied in the prior art. At this stage of detection of nonconformity, it is possible to take action upstream of the design of the circuit in order to correct the defects therein.

By way of example, the method according to the invention may be applied to a family of circuits dedicated to motor vehicle applications and configured for managing communications according to a predetermined standard such as the VAN standard known to the person skilled in the art.

Thus it is possible to cite a data communications controller in CMOS technology which carries out a protocol manager function. FIG. 5 represents the internal structure of such a circuit comprising a protocol manager module for testing of which the method according to the invention may be applied.

The access procedure is of the multi-access type based on the known principle of a non-destructive collision with bit carry.

This circuit manages not only the transmission and reception of messages but also the detection of errors.

In general the protocol manager module 1 carries out the following tasks:

shaping of the received or transmitted bits;

bit coding and decoding;

generation of transmission clocks;

processing and recognition of the preamble;

processing and recognition of the start of the frame; and management of access times, etc.

The manager module 1 is linked on the one hand to a microprocessor or to a microcontroller 4 via an interface 6 and a set of data, address and checking lines 5, and, on the other hand, to a communications line 2 via a line amplifier 3. It generally includes a logic module 16 for sending/and sending out signals intended for the line amplifier 3 and intended for the microprocessor via several modules, especially a storage memory for 9 messages received under the control of a received bit processor 13 and of a reception management interface 11. The control module 16 also receives signals output, on the one hand, by the communications line 2 via the line amplifier 3 and a bit sequencing logic module, and, on the other hand, by the microprocessor or microcontroller 4 via the interface 6, a message memory 7 to be transmitted under the control of a sending management interface 10 and of a sending bit processor 12. The protocol manager module 1 also comprises an error management logic module 14, a clock unit 15, and a random-access memory 18 containing identifiers and linked, on the one hand, to the interface 6 and, on the other hand, to the reception interface 11. The interface 6 with the microprocessor or microcontroller 4 is also equipped with interrupt logic 17 capable of sending an interrupt order INT. Moreover, it can easily be understood that in such a circuit numerous interactions exist between its various modules and the advantages afforded by the method according to the invention will be gauged when the conformity of this circuit to a standard has to be checked.

Needless to say, the invention is not limited to the examples which have just been described and numerous configurations may be applied to these examples without departing from the scope of the invention.

Hence, the method according to the invention may include any existing or future standard in any field of application where communication protocols are employed, and especially in domestic electronics. It is thus possible to apply the method according to the invention to certification of circuits according to the EIBUS, BATIBUS, MEDIABUS, D2B, I2C or GHS standards. In the field of motor vehicles, the J1850, CAN standards or any other standard may be applied by the method according to the invention. The latter may be applied to any type of module whatever the description mode used for its design, whether this mode is basic or high-level, for example of the VHDL type.

What is claimed is:

1. A method for checking conformity to a predetermined standard of a representative defined module of a circuit dedicated to management of a communications protocol, said module having been optimized in advance for a given application, which comprises:
    a first step for duplicating said module with a view to generating several duplicated modules which are identical to said module;
    a second step for operatively connecting said duplicated modules to a network bus;
    a third step for configuring each connected duplicated module according to definitions contained in said standard, so that the set of said configured modules is representative of real operating conditions of the designed circuit, the configuring step configuring the duplicated modules differently from each other; and
    a fourth step for applying to the network bus signals which are representative of frames in accordance with said standard, and abnormal or parasitic signals, and for collecting back, for analysis, the respective responses from each of said configured modules.

2. The method as claimed in claim 1, wherein said module which is representative of a circuit dedicated to management of a communications protocol has been obtained in advance by modification of an initial module described at a very high description level (VHDL).

3. The method as claimed in claim 1, wherein the third configuration step includes the step of configuring the duplicated modules either in Slave configuration mode or in Master configuration mode or in Master/Slave configuration mode, each of the configuration modes corresponding to one of the expected operating states of said circuit.

4. The method as claimed in claim 1, wherein the step for applying further includes the step of employing as the abnormal or parasitic signals, signals that comprise random signals.

5. The method as claimed in claim 1 wherein the step of configuring is performed in accordance with communications standards in the motor vehicle field, and wherein the step of applying is also performed in accordance with the communications standards in the motor vehicle field.

6. The method as claimed in claim 1 wherein the step of configuring is performed in accordance with communications standards in the domestic electronics field, and wherein the step of applying is also performed in accordance with the communications standards in the domestic electronics field.

7. A system for checking conformity to a predetermined standard by a representative module of a communications protocol circuit, comprising:
    a processing mechanism to duplicate the module into a plurality of modules substantially identical to said module,
    means for operatively connecting said duplicated modules to a network bus,
    means for configuring each duplicated module according to definitions contained in said standard in such a way that the set of said configured modules is substantially representative of real operating conditions of the circuit to be checked said means for configuring further being for configuring the duplicated modules differently from each other, and
    means for generating signals on the network bus.

8. The system as claimed in claim 7, wherein the module to be checked has been obtained in advance by modification of an initial module described at a very high definition level (VHDL).

9. The system as claimed in claim 7 wherein the network bus is representative of a multiplexed digital bus.

10. The system as claimed in claim 7, wherein it is included within an integration system further comprising means for forming a previously designed, modified module, and means for integrating the module checked by the method as claimed in the preceding claims according to a predetermined technology, with a view to manufacturing the circuit which it represents.

11. The system as claimed in claim 7 wherein the means for configuring operates in accordance with communications standards in the motor vehicle field, and wherein the means for generating signals also operates in accordance with the communications standards in the motor vehicle field.

12. The system as claimed in claim 7 wherein the means for configuring operates in accordance with communications standards in the domestic electronics field, and wherein the means for generating signals also operates in accordance with the communications standards in the domestic electronics field.

13. A method for checking conformity to a predetermined standard by a representative defined module of a communications protocol circuit, comprising the steps of:
    duplicating the representative module into a plurality of modules substantially identical to the representative module;

operatively connecting the plurality of modules to a network bus;

configuring each module differently according to the predetermined standard such that the configured modules are representative of real operating conditions of the circuit; and providing test signals to the network bus and collecting respective responses from each of the configured modules.

14. A method as claimed in claim 13 wherein the step of providing test signals includes the step of providing abnormal or parasitic signals and signals representative of frames according to the standard.

15. A method as claimed in claim 14 wherein the step of configuring includes the step of configuring the modules in slave mode, master mode, or master/slave mode.

16. A method as claimed in claim 15 wherein the step of providing abnormal or parasitic signals includes the step of providing random signals.

17. A system for checking the conformity to a predetermined standard by a representative module of a communications protocol circuit, the system comprising:

a network bus;

a plurality of modules substantially identical to the representative module, each module operatively coupled to the network bus, and each module configured differently according to the predetermined standard such that the modules are representative of real operating conditions; and a test signal generator, coupled to the network bus, to generate test signals for provision to the modules.

18. A system as claimed in claim 17 wherein the network bus includes a multiplexed digital bus.

19. A system as claimed in claim 18 wherein the test signal generator is to generate test signals including abnormal or parasitic signals and signals representative of frames according to the standard.

20. A system as claimed in claim 19 wherein the test signal generator is to generate signals that further include random signals.

* * * * *